(12) United States Patent
Samardzic et al.

(10) Patent No.: US 9,291,879 B2
(45) Date of Patent: Mar. 22, 2016

(54) HIDDEN CAMERA SYSTEM FOR VEHICLE

(71) Applicant: FORD GLOBAL TECHNOLOGIES, LLC, Dearborn, MI (US)

(72) Inventors: Igor Samardzic, Windsor (CA); David Lee Jarvis, Madison Heights, MI (US); Jeffrey Mayville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/467,841

(22) Filed: Aug. 25, 2014

(65) Prior Publication Data

US 2016/0054644 A1 Feb. 25, 2016

(51) Int. Cl.
| | | |
|---|---|---|
| *G03B 17/56* | (2006.01) | |
| *G03B 29/00* | (2006.01) | |
| *B60R 11/04* | (2006.01) | |
| *H04N 5/225* | (2006.01) | |
| *B60R 13/00* | (2006.01) | |

(52) U.S. Cl.
CPC .............. *G03B 17/561* (2013.01); *B60R 11/04* (2013.01); *B60R 13/005* (2013.01); *G03B 29/00* (2013.01); *H04N 5/2252* (2013.01); *H04N 5/2253* (2013.01); *H04N 5/2257* (2013.01)

(58) Field of Classification Search
CPC .. G03G 17/561; B60R 11/04; B60R 2300/00; B60R 2300/10; G08B 13/19632; G08B 13/19617; H04N 7/183; G03B 17/561
See application file for complete search history.

(56) References Cited

U.S. PATENT DOCUMENTS

| | | | |
|---|---|---|---|
| 7,726,434 B2 | 6/2010 | Poichmuller | |
| 7,891,886 B2 | 2/2011 | Schuetz | |
| 7,965,336 B2 | 6/2011 | Bingle et al. | |
| 2003/0146831 A1* | 8/2003 | Berberich et al. | 340/461 |
| 2006/0256459 A1* | 11/2006 | Izabel et al. | 359/872 |
| 2007/0132610 A1 | 6/2007 | Guernalec et al. | |
| 2009/0231430 A1* | 9/2009 | Buschmann et al. | 348/148 |
| 2009/0309971 A1* | 12/2009 | Schuetz | 348/148 |
| 2013/0010115 A1 | 1/2013 | Jerusalem et al. | |
| 2013/0215271 A1 | 8/2013 | Lu | |
| 2014/0060582 A1 | 3/2014 | Hartranft et al. | |
| 2015/0183302 A1* | 7/2015 | Da Deppo et al. | B60J 5/00 |

FOREIGN PATENT DOCUMENTS

| | | |
|---|---|---|
| KR | 10-1366594 B1 | 2/2013 |
| KR | 2013048535 A | 5/2013 |
| KR | 20140028766 A | 3/2014 |

OTHER PUBLICATIONS

English Machine Translation of KR101365594B1.
English Machine Translation of KR2013048535A.
English Machine Translation of KR2014028766A.

* cited by examiner

*Primary Examiner* — W B Perkey
(74) *Attorney, Agent, or Firm* — Jason Rogers; King & Schickli, PLLC

(57) ABSTRACT

A hidden camera system for a vehicle includes a cover, a camera, a drive motor and a linkage connecting the drive motor to the cover and the camera. A first stop establishes a repeatable and fully deployed position for the camera. An abutment engages that stop when the camera is fully deployed. A biasing element biases the camera into the fully deployed position to ensure that the camera is always fully deployed into the same position.

20 Claims, 9 Drawing Sheets

HIDDEN CAMERA SYSTEM FOR VEHICLE

TECHNICAL FIELD

This document relates generally to camera systems for vehicles and, more particularly, to a hidden camera system that may be consistently and repeatedly fully deployed into the same position.

BACKGROUND

It is known in the art to provide a camera system for a vehicle wherein the camera is normally concealed behind a cover, such as a vehicle badge or emblem. When activated, the cover is opened and the camera is deployed to provide a desired field of view useful in allowing an operator to better operate a vehicle. Such a camera system is disclosed, for example, in U.S. Pat. No. 7,891,886. Significantly, the repeatability of the positioning of the camera in the fully deployed position is not necessarily assured with state-of-the-art hidden camera systems. This is a concern as the ability to repeatedly position a camera in the same, fully deployed position, is particularly important in order to provide a consistent perspective for the vehicle operator. Further, in a vehicle equipped with multiple camera fields of view, consistent deployment into a single operating position is required in order to provide the proper amalgamation. This document relates to a new and improved camera system that addresses this shortcoming of prior art camera systems.

SUMMARY

In accordance with the purposes and benefits described herein, a hidden camera system is provided for a vehicle. That hidden camera system comprises a cover, a camera, a drive motor and a linkage connecting the drive motor to the cover and the camera. A first stop establishes a repeatable and fully deployed position for the camera. An abutment engages the stop when the camera is fully deployed. Further, a biasing element is provided to bias the camera into the fully deployed position.

In one possible embodiment the camera system further includes a housing and the first stop is provided on the housing. In one possible embodiment the abutment is provided on the linkage. That linkage includes a crank arm, a first link, a second link, a cover support bracket and a camera mounting bracket. The drive motor is connected to the crank arm through a transmission.

The second link is connected at a first end to the cover support bracket and at a second end to the camera mounting bracket. Further, the second link is pivotally connected to the housing at a first point intermediate the first and second ends. The first link is pivotally connected to the second link at a second point between the first point and the second end. In one possible embodiment, the second link is substantially c-shaped.

In one possible embodiment, the camera is held in the camera mounting bracket which is pivotally connected to the housing by a first pivoting support arm. In this embodiment the biasing element may be a torsion spring operating on the first pivoting support arm and biasing the abutment into engagement with the first stop and, thereby, the camera into the fully deployed position. The cover support bracket is pivotally connected to the housing by a second pivoting support arm.

Alternatively, the camera system may be described as comprising a housing, a camera pivotally attached to the housing on a first pivoting support arm and a cover pivotally attached to the housing on a second pivoting support arm. A linkage connects a drive motor and transmission with the camera and the cover. A first stop on the housing establishes a repeatable and fully deployed position for the camera. An abutment on the linkage engages the first stop when the camera is fully deployed. Further a biasing element biases the camera into the fully deployed position.

In one possible embodiment, the biasing element is a torsion spring operating on the first pivoting support arm. In one possible embodiment, the system further includes a second stop on the housing. The abutment engages the second stop when the camera is in a fully retracted position and the cover is closed over the camera.

In the following description, there are shown and described several preferred embodiments of the camera system. As it should be realized, the camera system is capable of other, different embodiments and its several details are capable of modification in various, obvious aspects all without departing from the camera system as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the camera system and together with the description serve to explain certain principles thereof. In the drawings.

Reference will now be made in detail to the present preferred embodiment of the camera system, examples of which are illustrated in the accompanying drawings.

DETAILED DESCRIPTION

Figure 1:
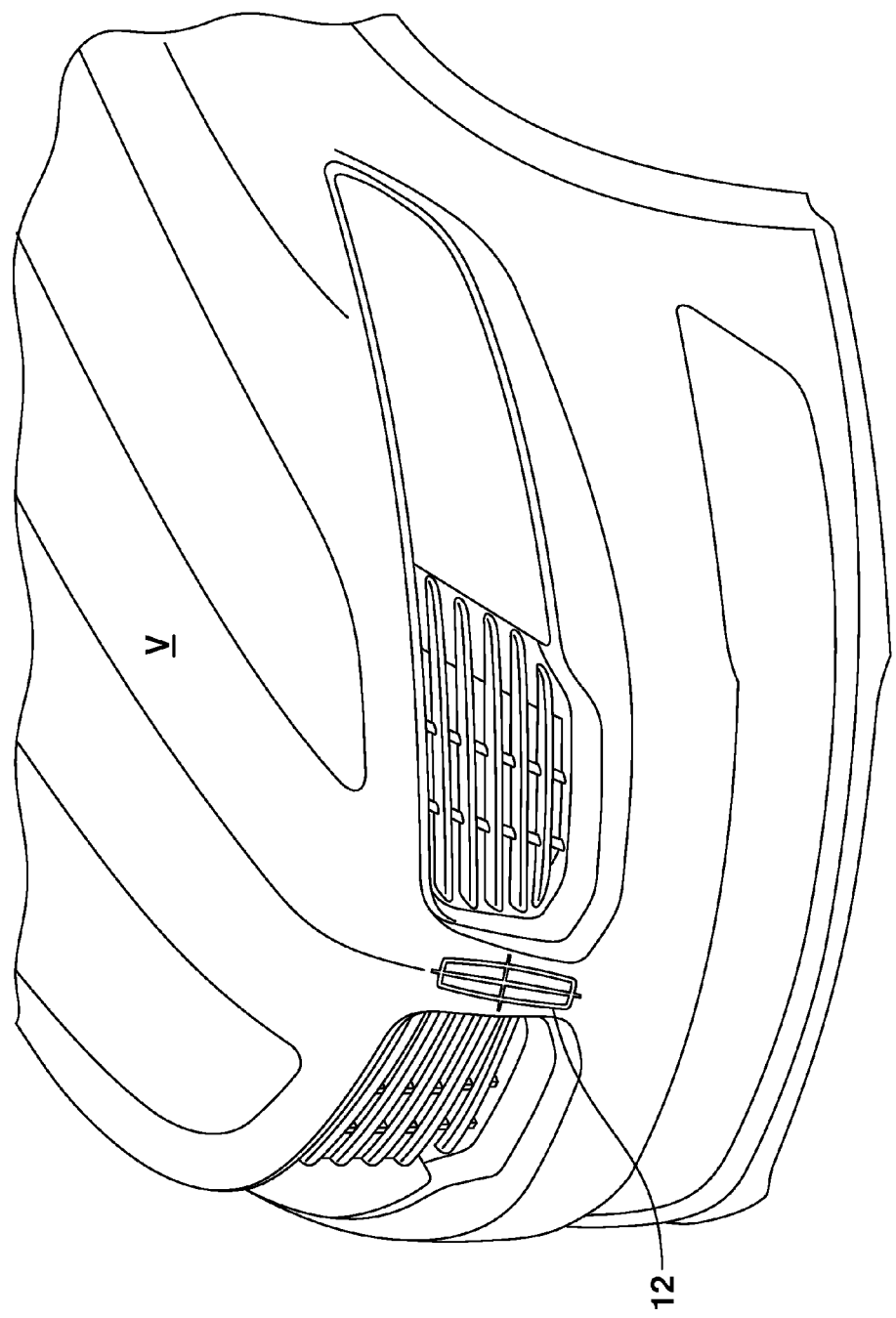
FIG. 1 is a front elevational view of a vehicle equipped with the current camera system which is shown in a retracted or closed position so that the camera is hidden from view by the manufacturer emblem or cover provided on the vehicle.
Figure 2:
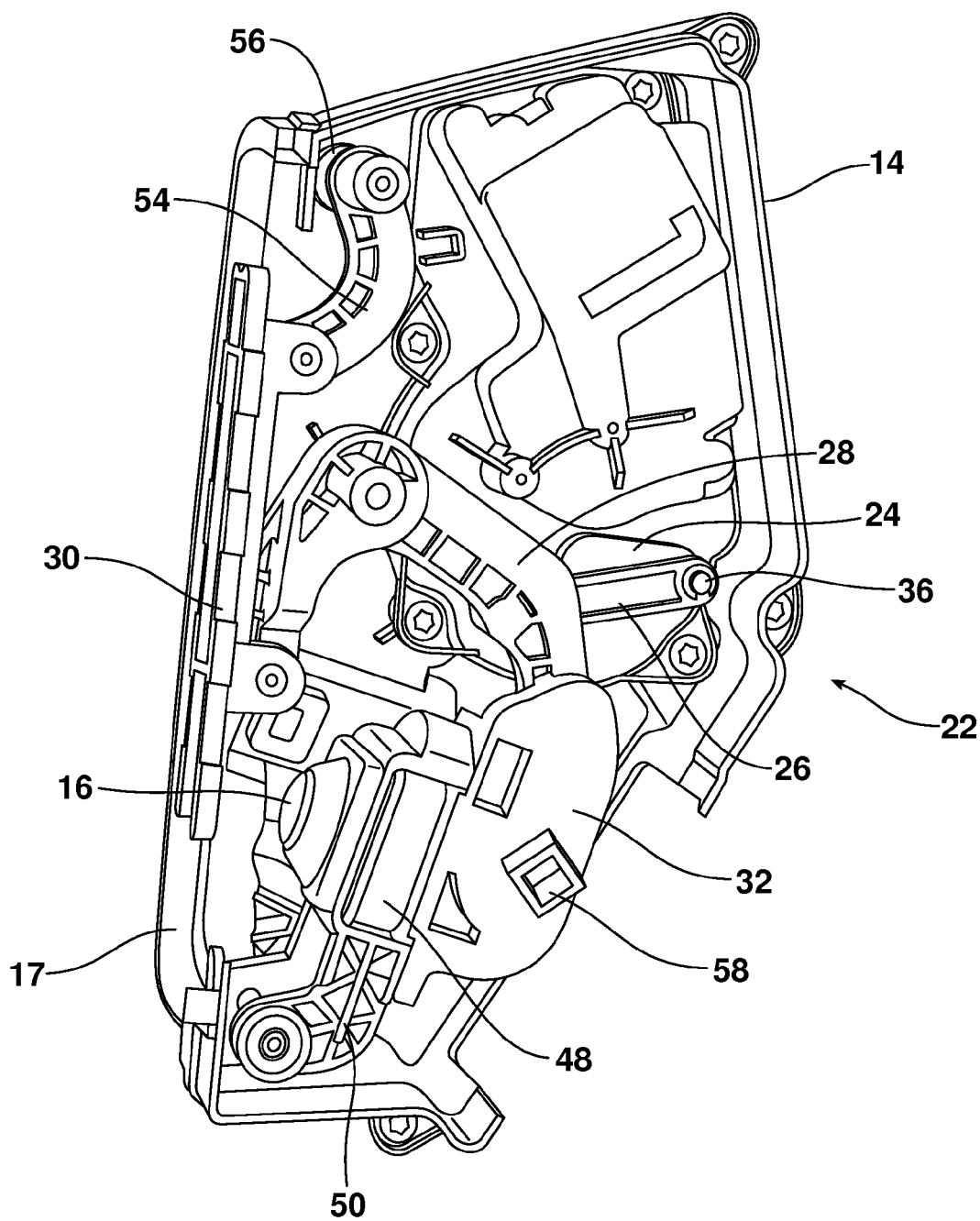
FIG. 2 is a first detailed, left side fragmentary view of the camera system in a retracted position.
Figure 3:
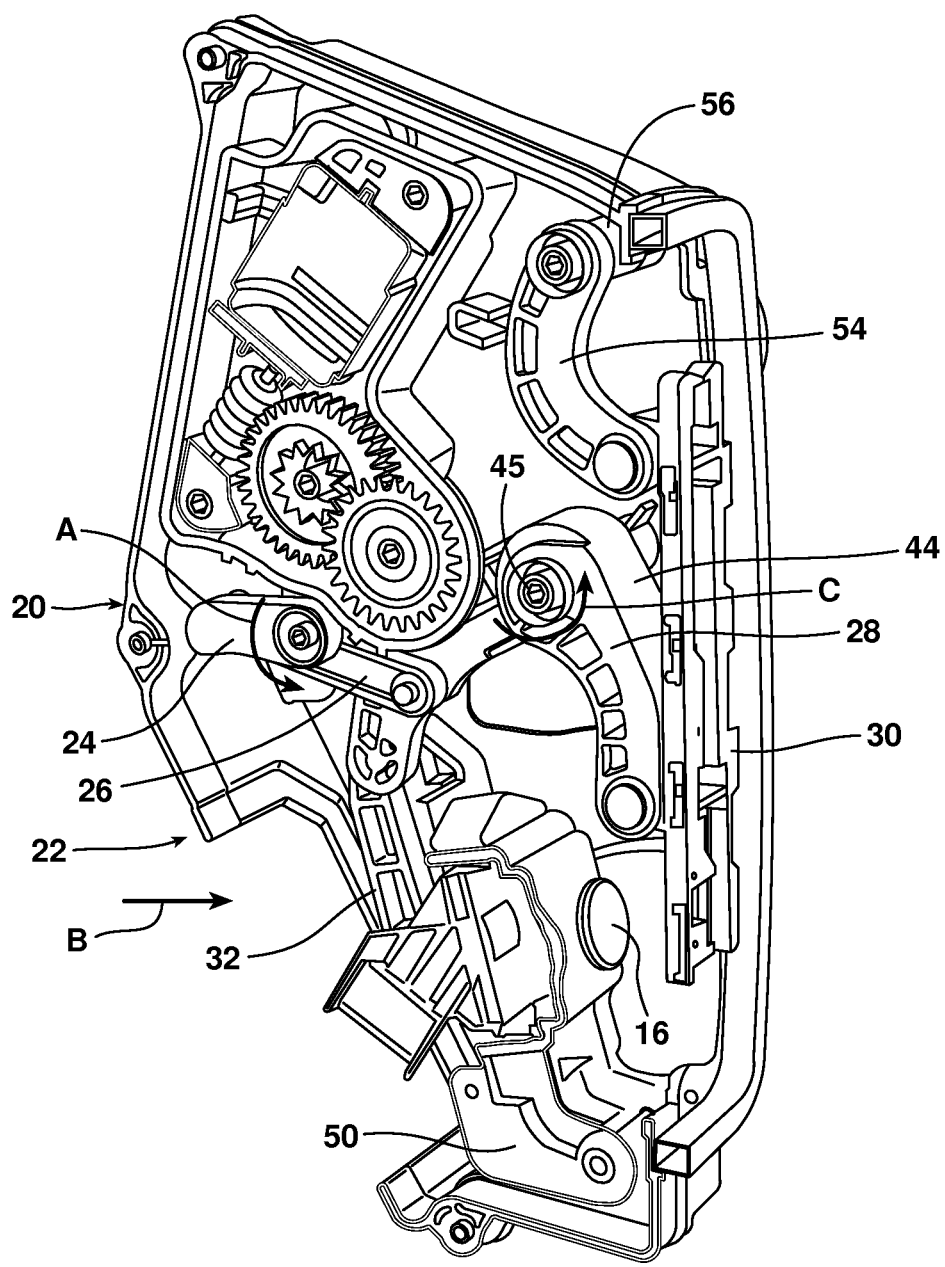
FIG. 3 is a second detailed, right side fragmentary view of the camera system in a retracted position.

Reference is now made to FIG. 1 illustrating a vehicle V equipped with a hidden camera system 10 which is concealed behind the cover 12 which, in the illustrated embodiment, is formed by the manufacturer emblem. As illustrated in FIGS. 2 and 3, the hidden camera system 10 includes a housing 14 that holds a camera 16, a drive motor 18 and associated gear transmission 20, and a linkage 22 connecting the drive motor and gear transmission to the cover 12 and the camera 16. A gasket 17 is provided around the front opening 19 of the housing 14 and seals the front of the housing when the cover 12 is closed.

As illustrated, the linkage 22 includes a crank arm 24, a first link 26, a second link 28, a cover support bracket 30 on which the cover 12 is mounted, and a camera mounting bracket 32. More specifically, the crank arm 24 is connected to the gear transmission 20 by a rotating driveshaft 34. The opposite end of the crank arm 24 is pivotally connected to the first link 26 by the pivot pin 36. The second end of the first link 26 is connected to the second link 28 by the pivot pin 38. The first end of the second link 28 is connected to the cover support bracket 30 by a pivot pin 40. The second end of the second link 28 is connected to the camera mounting bracket 32 by a cam or roller 42 that is received and moves in a track 43 provided on the camera mounting bracket.

Figure 7:
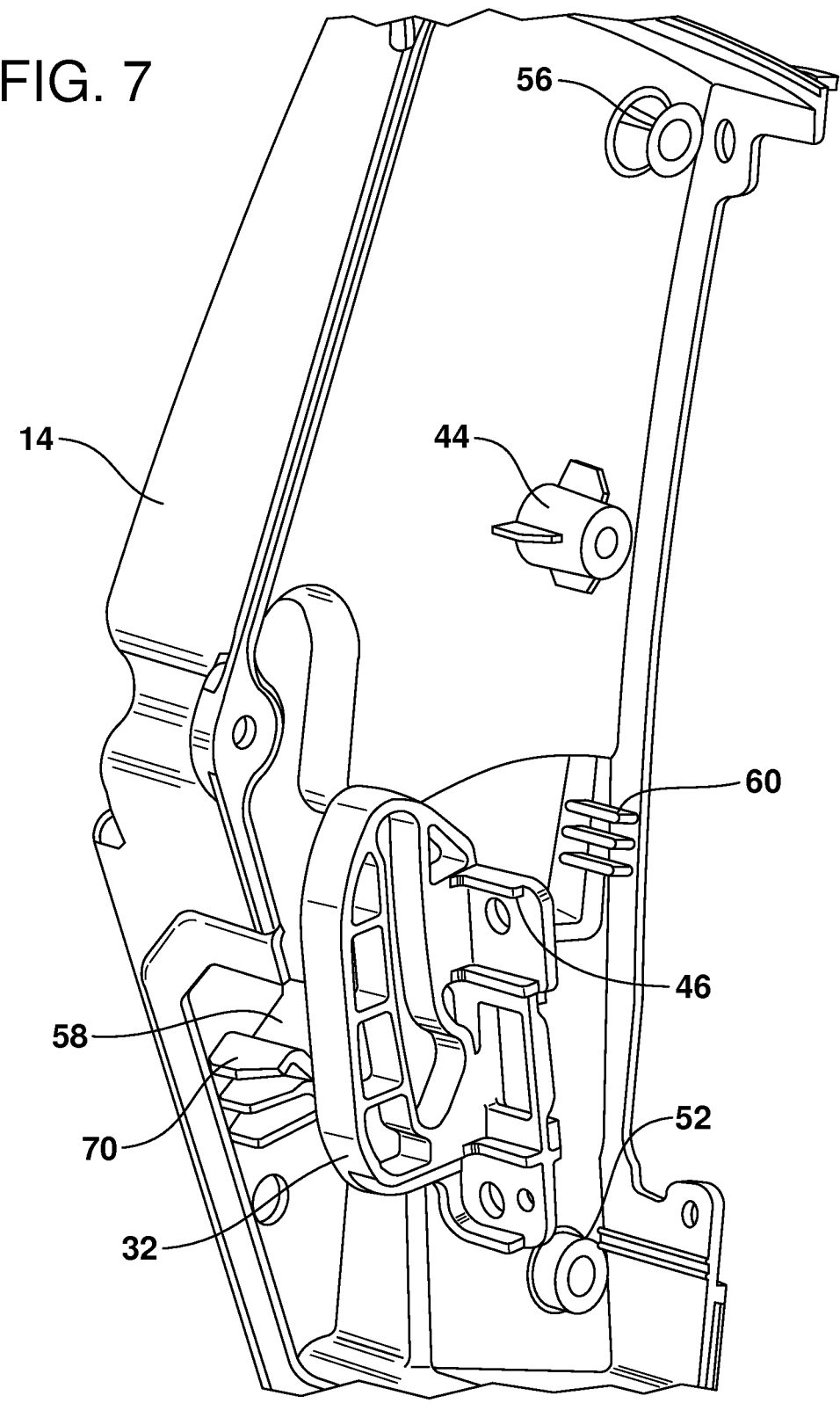
FIG. 7 is a detailed perspective view of the camera link with the abutment on the camera link engaging the second stop when the camera is in the fully retracted position and the cover is closed over the camera.

As should be further appreciated, the second link 28 is pivotally mounted at a first point to the housing 14 by a pivot pin 45 received in a boss 44 (see also FIG. 7). The pivot pin 38 connecting the first and second links 26, 28 is provided at a second point on the link 28 between the first point and the second end. In the illustrated embodiment, the second link 28 is substantially c-shaped.

The camera mounting bracket 32 includes flanges 46 and other related structures to engage the housing 48 of the camera 16 and securely hold the camera in position. The camera mounting bracket 32 is pivotally connected to the housing 14 by means of a first pivoting support arm 50. More specifically, the support arm 50 is pivotally supported on the housing 14 by means of the boss 52. The cover support bracket 30 (and, therefore, the cover 12 supported thereon) is pivotally mounted to the housing 14 by means of a second pivoting support arm 54. More specifically, the second support arm 54 is pivotally mounted to the housing 14 on the boss 56.

Figure 4:
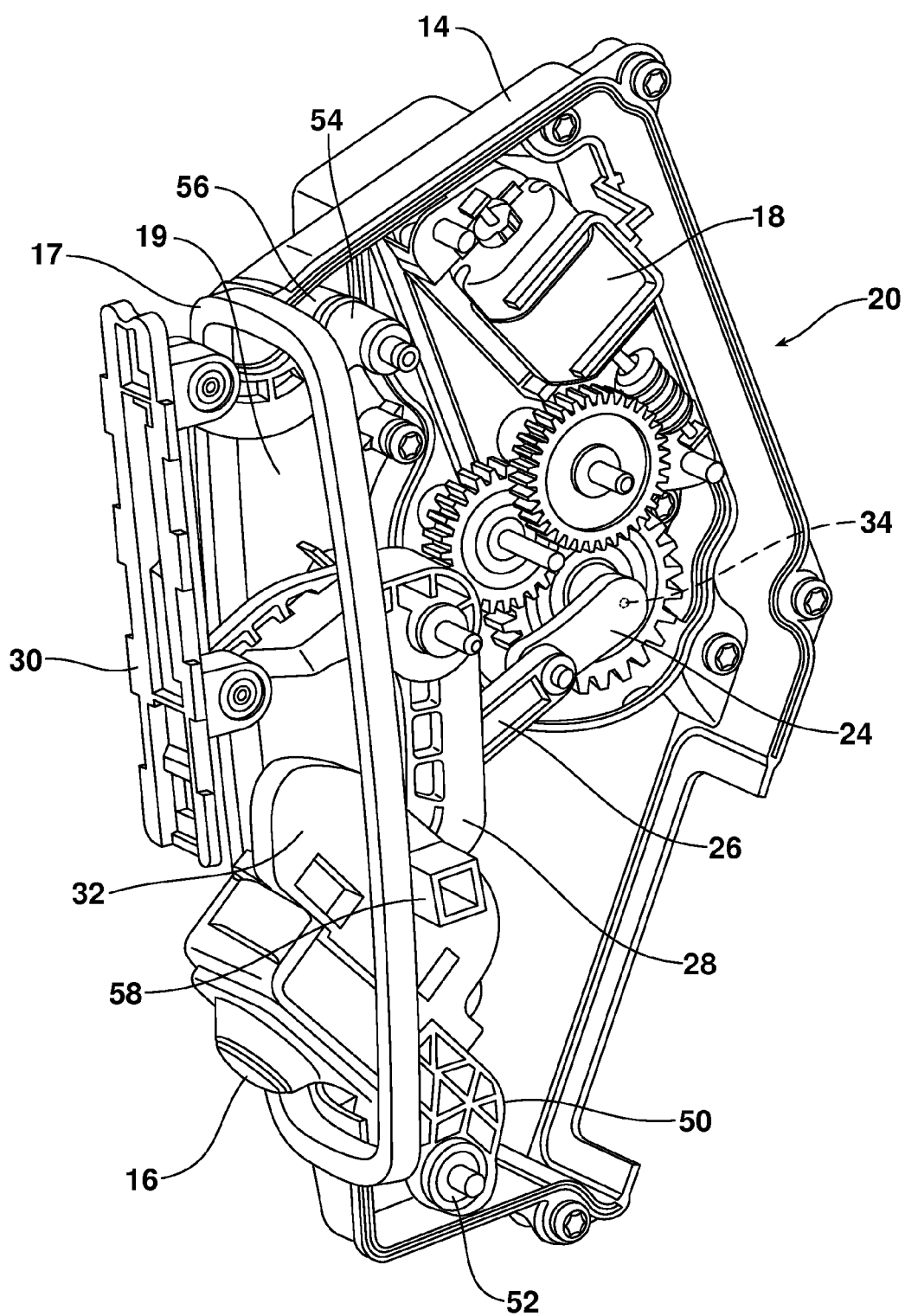
FIG. 4 is a first detailed, left side fragmentary view of the camera system in the fully deployed position.
Figure 5:
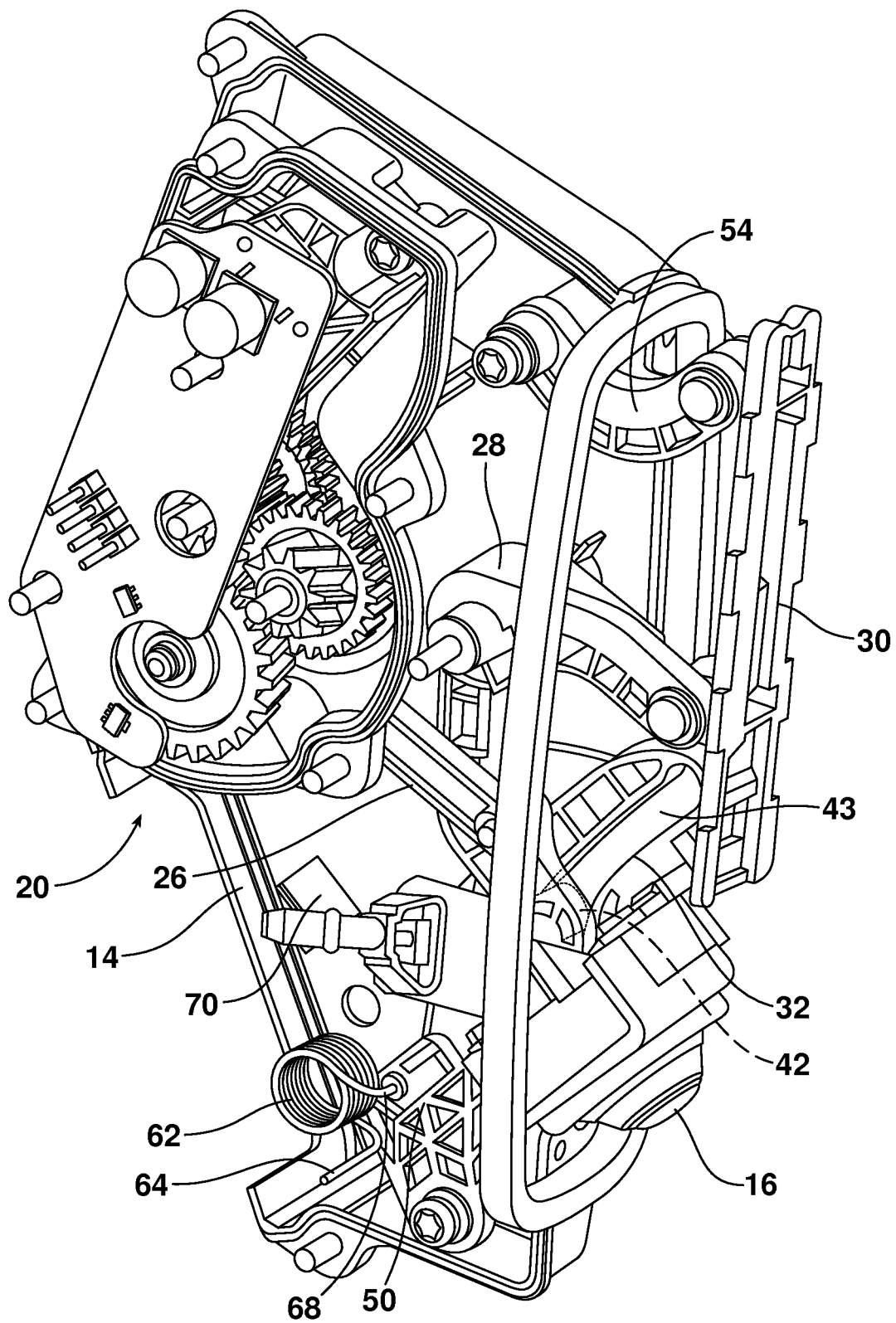
FIG. 5 is a second detailed, right side fragmentary view of the camera system in the fully deployed position.
Figure 6:
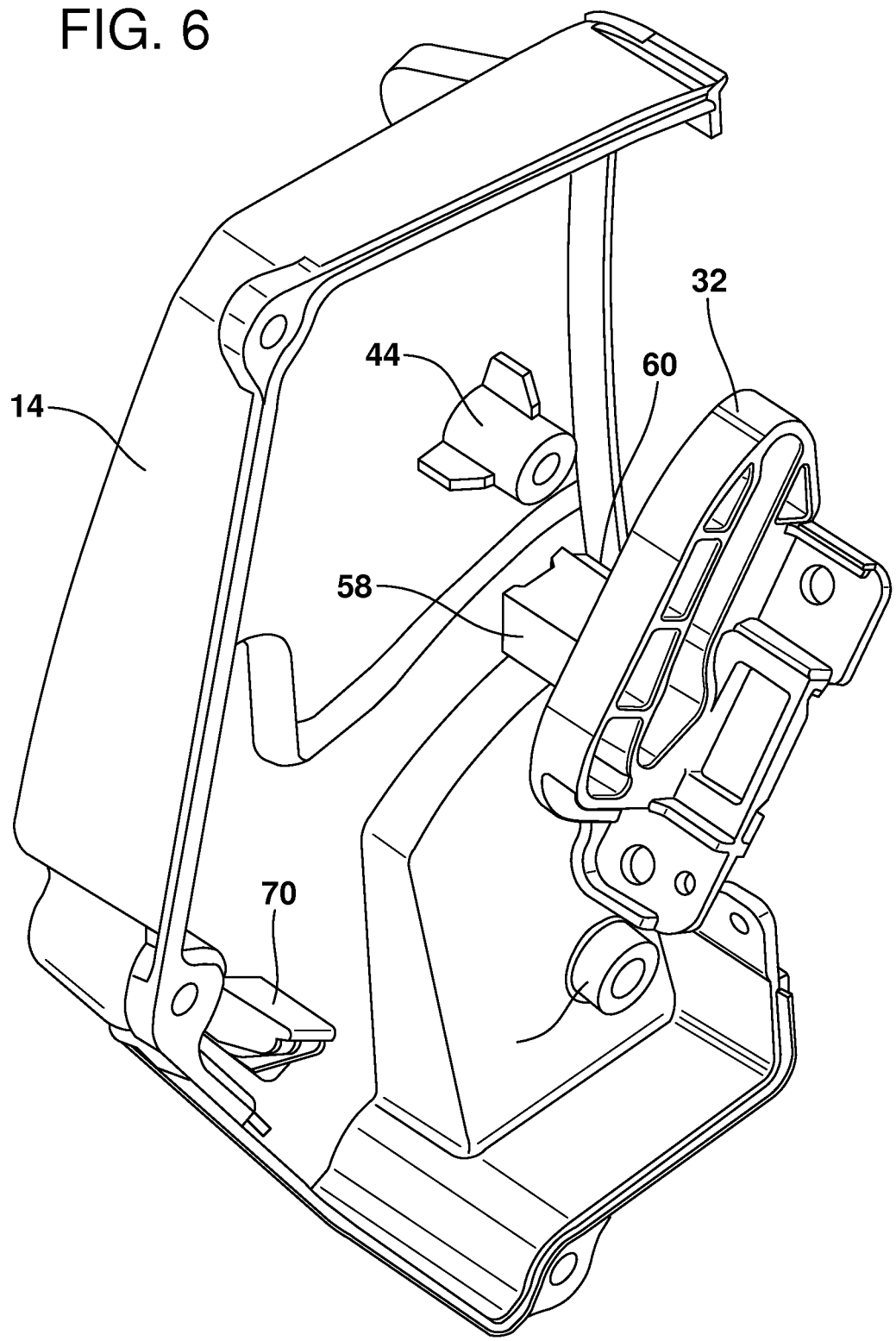
FIG. 6 is a detailed perspective view of the camera link with the abutment provided on the camera link engaging a first stop when the camera is in the fully deployed position.
Figure 8:
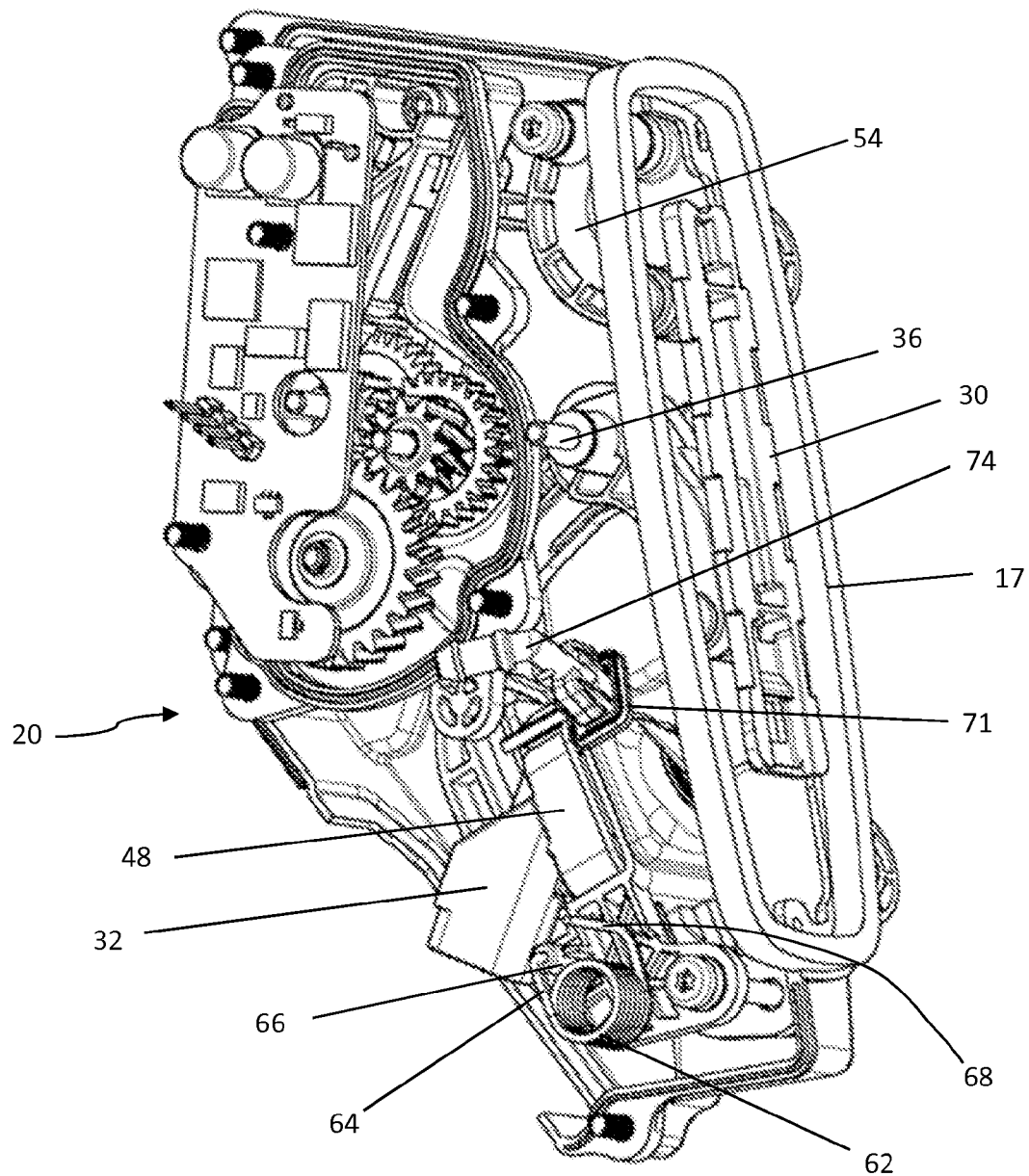
FIG. 8 is a cross-sectional view illustrating the biasing element or torsion spring that is connected to the support arm for the camera.

FIGS. 2 and 3 illustrate the hidden camera system 10 with the camera 16 in the fully retracted position and the camera hidden from view by the cover (deleted from figure for clarity). When activated, the camera 16 is displaced to a fully deployed position illustrated in FIGS. 4 and 5. More specifically, the drive motor 18 operates through the gear transmission 20 and the driveshaft 34 to turn the crank arm 24 in the direction of action arrow A. This causes the first link 26 to translate in the direction of action arrow B so as to pivot the second link 28 about the boss 44 in the direction of action arrow C. This simultaneously causes the cover 12 to pivot open about the boss 56 and the camera 16 to pivotally deploy about the boss 52. An abutment 58, projecting from the side of the camera mounting bracket 32 engages a stop 60 on the housing 14 when the camera 16 and cover 12 are both in the fully deployed position. Here it should be appreciated that a biasing element, in the form of a torsion spring 62 received around the boss 52, biases the camera 16 toward the fully deployed position. See FIG. 8. This ensures that the camera 16 is repeatedly fully deployed into the same position during each deployment. More specifically, the torsion spring 62 has a first end 64 secured in a socket 66 to the housing 14 and a second end 68 engaging the camera mounting bracket 32.

When it is desired to retract the camera 16, the drive motor 18 is driven in the opposite direction. This drives the crank arm 24 in the direction opposite to action arrow A which in turn causes the drive link 26 to translate in a direction opposite to action arrow B. As a result, the second link 28 pivots in a direction opposite to action arrow C causing the camera 16 to be retracted while the cover 12 is closed. When the camera 16 is fully retracted and the cover 12 is fully closed, the abutment 58 engages a second stop 70 formed on the housing 14. See FIG. 7.

Figure 9:
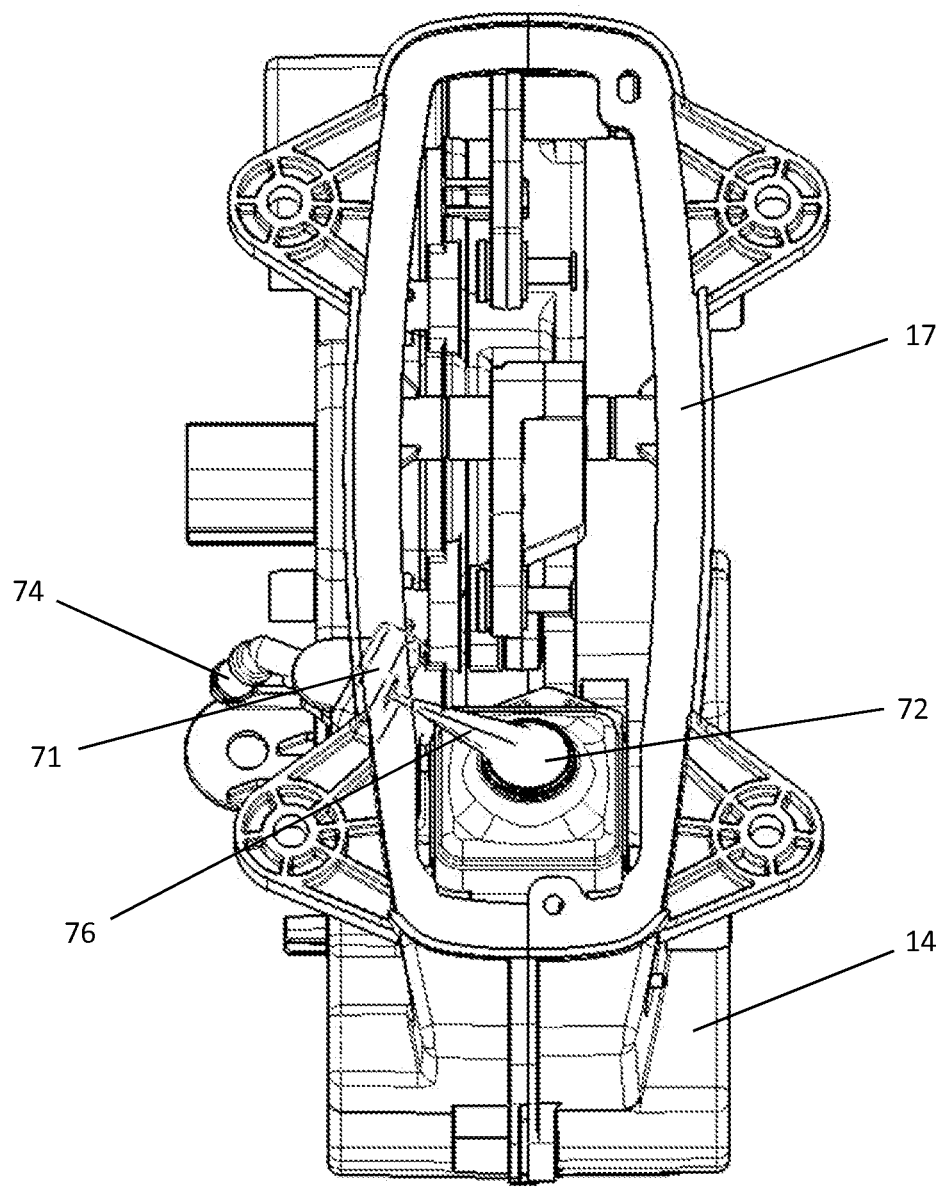
FIG. 9 is a detailed front elevational view illustrating the camera washing system.

As illustrated in FIG. 9, the hidden camera system 10 may also include a nozzle jet 71 for cleaning the lens or cover window 72 of the camera 16. More specifically, during each cleaning cycle cleaning fluid is fed by a pump (not shown) to the nozzle jet 71 through the delivery line 74 and is expelled in a washing stream 76 across the lens or cover window 72. Such a cleaning cycle may be initiated from inside the vehicle each time the vehicle operator engages the wiper washer to clean the windshield and the camera is in the stowed position.

In summary, numerous benefits result from applying the concepts disclosed in this document. By equipping the camera system 10 with the biasing element 62, which functions to always bias the camera into the fully deployed position defined by engagement of the abutment 58 with the stop 60, full deployment of the camera is always ensured. Accordingly, a consistent viewing perspective is always provided each time the hidden camera system 10 is activated and the camera 16 is deployed.

The foregoing has been presented for purposes of illustration and description. It is not intended to be exhaustive or to limit the camera system 10 to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A hidden camera system for a vehicle, comprising:
   a cover;
   a camera;
   a drive motor;
   a linkage connecting said drive motor to said cover and said camera;
   a first stop establishing a repeatable and fully deployed position for said camera;
   an abutment that engages said first stop when said camera is fully deployed; and
   a biasing element to bias said camera into said fully deployed position.

2. The camera system of claim 1, further including a housing.

3. The camera system of claim 2, wherein said first stop is provided on said housing.

4. The camera system of claim 3, wherein said abutment is provided on said linkage.

5. The camera system of claim 4, wherein said linkage includes a crank arm, a first link, a second link, a cover support bracket and a camera mounting bracket.

6. The camera system of claim 5, wherein said drive motor is connected to said crank arm through a transmission.

7. The camera system of claim 6, wherein said second link is connected at a first end to said cover support bracket and at a second end to said camera mounting bracket and is pivotally connected to said housing at a first point intermediate said first and second ends.

8. The camera system of claim 7, wherein said first link is pivotally connected to said second link at a second point between said first point and said second end of said second link.

9. The camera system of claim 8, wherein said second link is substantially c-shaped.

10. The camera system of claim 9, wherein said camera is held in a camera mounting bracket that is pivotally connected to said housing by a first pivoting support arm.

11. The camera system of claim 10, wherein said biasing element is a torsion spring operating on said first pivoting support arm and biasing said abutment into engagement with said first stop and said camera into said fully deployed position.

12. The camera system of claim 11, wherein said cover support bracket is pivotally connected to said housing by a second pivoting support arm.

13. The camera system of claim 2, wherein said camera is held in a camera mounting bracket that is pivotally connected to said housing by a first pivoting support arm.

14. The camera system of claim 13, wherein said biasing element is a torsion spring operating on said first pivoting support arm and biasing said abutment into engagement with said first stop and said camera into said fully deployed position.

15. The camera system of claim 14, further including a second stop on said housing.

16. The camera system of claim 15, wherein said abutment engages said second stop when said camera is in a fully retracted position and said cover is closed over said camera.

17. A hidden camera system for a vehicle, comprising:
a housing having a first stop;
a camera pivotally attached to said housing on a first pivoting support arm;
a cover pivotally attached to said housing on a second pivoting support arm;
a drive motor and transmission;
a linkage connecting said drive motor and transmission with said camera and said cover;
an abutment on said linkage that engages said first stop when said camera is fully deployed; and
a biasing element to bias said camera into said fully deployed position.

18. The system of claim 17, wherein said biasing element is a torsion spring operating on said first pivoting support arm.

19. The system of claim 18, further including a second stop on said housing.

20. The system of claim 19, wherein said abutment engages said second stop when said camera is in a fully retracted position and said cover is closed over said camera.

* * * * *